(12) United States Patent
Lin

(10) Patent No.: US 12,483,510 B2
(45) Date of Patent: Nov. 25, 2025

(54) METHOD, DEVICE, AND COMPUTER PROGRAM PRODUCT FOR SENDING MESSAGE

(71) Applicant: Dell Products L.P., Round Rock, TX (US)

(72) Inventor: Zhi Yuan Lin, Xiamen (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/653,455

(22) Filed: May 2, 2024

(65) Prior Publication Data

US 2025/0323875 A1 Oct. 16, 2025

(30) Foreign Application Priority Data

Apr. 10, 2024 (CN) .......................... 202410430316.8

(51) Int. Cl.
  *H04L 47/28* (2022.01)
(52) U.S. Cl.
  CPC .................................. *H04L 47/28* (2013.01)
(58) Field of Classification Search
  CPC ... H04L 5/0053; H04L 5/0055; H04L 5/0007; H04L 5/0044; H04L 5/0094; H04L 5/001; H04L 1/1854; H04L 5/0064; H04L 1/1887; H04L 1/1812; H04L 5/0048; H04L 5/0091; H04L 1/0026; H04L 1/0003; H04L 1/1822; H04L 1/1896; H04L 1/08; H04L 5/0051; H04L 5/006; H04L 1/0009; H04L 47/50; H04L 47/2441; H04L 47/6215;
  (Continued)

(56) References Cited

U.S. PATENT DOCUMENTS 6,023,230 A * 2/2000 Dorenbosch ........ H04W 88/022
  455/512
11,886,372 B1 * 1/2024 Ying ................... G06F 13/4221
  (Continued)

OTHER PUBLICATIONS

Wikipedia, "Electronic Data Interchange," https://en.wikipedia.org/wiki/Electronic_data_interchange, Apr. 13, 2024, 10 pages.
(Continued)

*Primary Examiner* — Djenane M Bayard
(74) *Attorney, Agent, or Firm* — Ryan, Mason & Lewis, LLP

(57) ABSTRACT

A method in an illustrative embodiment includes generating a first message and a second message based on local data. The method further includes determining time-sensitivity of the first message and time-sensitivity of the second message. The method further includes allocating a first message channel and a second message channel for communicating with a remote system to the first message and the second message respectively based on the time-sensitivity of the first message and the time-sensitivity of the second message. In addition, the method further includes sending the first message and the second message to the remote system via the first message channel and the second message channel. In this way, the data transmission efficiency and the ability to handle high data load of the system can be enhanced, and the impact on the subsequent workflow can be reduced, thereby improving the working efficiency of an enterprise.

20 Claims, 11 Drawing Sheets

(58) Field of Classification Search
CPC ..... H04L 5/0058; H04L 69/14; H04L 1/1671; H04L 5/0098; H04L 47/6275; H04L 5/00; H04L 1/1819; H04L 47/2433; H04L 5/0092; H04L 47/245; H04L 5/14; H04L 49/90; H04L 47/2458; H04L 47/6295; H04L 45/02; H04L 45/036; H04L 45/037; H04L 45/0377; H04L 45/08; H04L 45/20; H04L 45/566; H04L 47/2483; H04L 47/32; H04L 47/35; H04L 47/76; H04L 49/3009; H04L 67/12; H04L 67/306; H04L 69/22; H04L 41/50; H04L 47/621; H04L 49/9078; H04L 67/1097; H04L 67/535; H04L 47/2425; H04L 63/083; H04L 63/102; H04L 41/22; H04L 43/028; H04L 47/12; H04L 47/2475; H04L 47/62; H04L 47/623; H04L 47/627; H04L 47/629; H04L 63/0227; H04L 67/101; H04L 67/141; H04L 1/0057; H04L 2012/5636; H04L 2012/5649; H04L 2012/5651; H04L 2012/5679; H04L 2012/5681; H04L 41/5022; H04L 47/10; H04L 47/31; H04L 47/52; H04L 47/568

See application file for complete search history.

(56) References Cited

U.S. PATENT DOCUMENTS

2004/0160971 A1\* 8/2004 Krause ................. H04L 47/564
370/412
2013/0064386 A1\* 3/2013 Yerrace ................. H04R 5/033
381/79
2017/0359778 A1\* 12/2017 Chen ................... H04M 1/2535

OTHER PUBLICATIONS

Amazon Web Services, "What is Electronic Data Interchange?" https://aws.amazon.com/what-is/electronic-data-interchange/, Accessed May 2, 2024, 8 pages.
U.S. Customs and Border Protection, "Transmitting Data to CBP via Electronic Data Interchange (EDI)," https://www.cbp.gov/trade/automated/getting-started/transmitting-data-cbp-electronic-data-interchange-edi, Accessed May 2, 2024, 5 pages.

\* cited by examiner

METHOD, DEVICE, AND COMPUTER PROGRAM PRODUCT FOR SENDING MESSAGE

RELATED APPLICATION

The present application claims priority to Chinese Patent Application No. 202410430316.8, filed Apr. 10, 2024, and entitled "Method, Device, and Computer Program Product for Sending Message," which is incorporated by reference herein in its entirety.

FIELD

The present disclosure relates to the field of communications, and more particularly, to a method, a device, and a computer program product for sending a message.

BACKGROUND

With the ongoing technical development of enterprises, various enterprises need to send data of their own in the form of messages to a remote system outside the enterprises, and then receive response messages for the sent data from the remote system. The messages received by the remote system from the various enterprises contain standardized data and files, which can speed up the data processing flow, reduce the time and cost spent by the enterprises waiting for acknowledgment response messages from the remote system, and improve the efficiency of data exchange.

In order to send data to the remote system, an enterprise needs to register an exclusive account in the remote system, and then the remote system can open an exclusive message channel for the enterprise for data exchange. The local system of the enterprise can use the exclusive account to open a message channel and send messages to the remote system via the message channel. After receiving a message from the enterprise, the remote system can automatically or manually confirm the data and file in the message, and then send a response message to the local system of the enterprise via the exclusive message channel. Only after receiving the response message from the remote system can the enterprise continue to carry out the subsequent workflow in compliance. Therefore, it is very important for an enterprise to be able to send messages to a remote system smoothly and receive acknowledgment response messages from the remote system in time.

SUMMARY

In a first aspect of embodiments of the present disclosure, a method for sending a message is provided. The method includes generating a first message and a second message based on local data. The method further includes determining time-sensitivity of the first message and time-sensitivity of the second message. The method further includes allocating a first message channel and a second message channel for communicating with a remote system to the first message and the second message respectively based on the time-sensitivity of the first message and the time-sensitivity of the second message. In addition, the method further includes sending the first message and the second message to the remote system via the first message channel and the second message channel.

In a second aspect of embodiments of the present disclosure, an electronic device is provided. The electronic device includes at least one processor and a memory coupled to the at least one processor. The memory has instructions stored therein which, when executed by the at least one processor, cause the electronic device to perform actions. The actions include generating a first message and a second message based on local data. The actions further include determining time-sensitivity of the first message and time-sensitivity of the second message. The actions further include allocating a first message channel and a second message channel for communicating with a remote system to the first message and the second message respectively based on the time-sensitivity of the first message and the time-sensitivity of the second message. In addition, the actions further include sending the first message and the second message to the remote system via the first message channel and the second message channel.

In a third aspect of embodiments of the present disclosure, a computer program product is provided. The computer program product is tangibly stored on a non-transitory computer-readable medium and includes machine-executable instructions which, when executed by a machine, cause the machine to implement a method for sending a message. The method further includes determining time-sensitivity of the first message and time-sensitivity of the second message. The method further includes allocating a first message channel and a second message channel for communicating with a remote system to the first message and the second message respectively based on the time-sensitivity of the first message and the time-sensitivity of the second message. In addition, the method further includes sending the first message and the second message to the remote system via the first message channel and the second message channel.

It should be understood that the content described in this Summary is neither intended to define key or essential features of embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Figure 1:
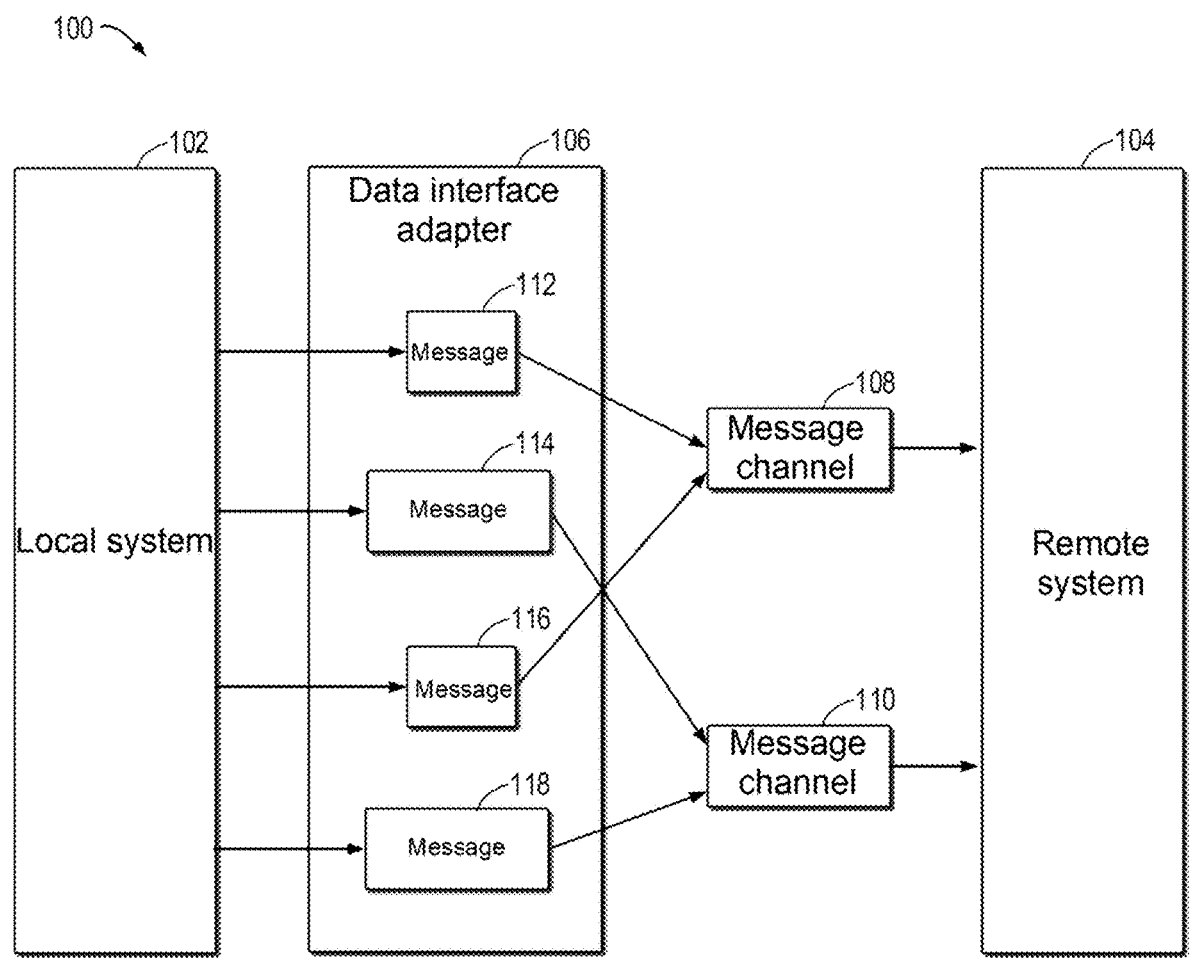
FIG. 1 is a schematic diagram of an example environment in which multiple embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit implementations may also be included below.

As mentioned above, when a local system of an enterprise sends a message to a remote system, it can use the exclusive account of the enterprise to open an exclusive message channel for communication with the remote system, and send a message to the remote system via this message channel. In some scenarios, the messages to be sent may include, for example, a project registration message for registering a project (e.g., information and resources associated with an enterprise) in the remote system, an acknowledgment request message for sending data to the remote system and requesting the remote system to acknowledge the data, and a historical data message for sending historical data to the remote system.

Among these messages, some messages have high time-sensitivity (also called first time-sensitivity herein), while others have low time-sensitivity (also called second time-sensitivity herein, the first time-sensitivity being higher than the second time-sensitivity). For example, after the project registration message is sent, it is necessary to receive the response message from the remote system in time to carry out the subsequent workflow for the registered project, so the project registration message has a high time-sensitivity. In addition, after the acknowledgment request message is sent, it is also necessary to receive the response message from the remote system in time to carry out the subsequent workflow for the acknowledged data, so the acknowledgment request message also has a high time-sensitivity. However, the historical data message is only used to acknowledge the historical data, and the speed of its processing process has no great influence on the normal workflow, so the historical data message has a low time-sensitivity.

In these scenarios, various types of messages are sent to the remote system through exclusive message channels, and then the response messages from the remote system are received through the exclusive message channels. Only after receiving a response message from the remote system can an enterprise continue to carry out the subsequent workflow. However, historical data messages usually contain a large amount of data (project registration messages and acknowledgment request messages usually contain a small amount of data) as they include all aspects of data over a long time in the past. Such large messages pose a challenge to the processing capacity of the remote system, such that the only message channel between the local system and the remote system is likely to be blocked due to the insufficient processing capacity of the remote system. This affects the sending of messages with high time-sensitivity, and thus seriously affects the subsequent workflow of the enterprise.

In view of this, embodiments of the present disclosure provide a solution for sending a message. In this solution, an additional message channel can be established between a local system and a remote system. This solution can generate two types of messages based on local data and determine the time-sensitivity of these two types of messages. Then, this solution can allocate one type of message to one message channel and the other type of message to another message channel based on the time-sensitivity of the two types of messages. Then, this solution can send the two types of messages to the remote system through these two message channels.

In this way, simultaneous data transmission can be realized by using a dual-channel architecture, thus enhancing the data transmission efficiency and the ability to handle high data load of the system. In addition, this dual-channel architecture can enhance the robustness of the system, and even if one message channel is blocked, it can be ensured that messages with high time-sensitivity can be sent to the remote system through the dedicated message channel for messages with high time-sensitivity, thus reducing the impact on the subsequent workflow and improving the working efficiency of the enterprise.

FIG. 1 is a schematic diagram of an example environment 100 in which multiple embodiments of the present disclosure can be implemented. As shown in FIG. 1, the environment 100 includes a local system 102, a remote system 104, and a data interface adapter 106. The local system 102 is an internal business system of an enterprise in which enterprise data is stored. For example, the enterprise data may include data for generating messages such as a project registration message, an acknowledgment request message, a historical data message, and the like. It should be noted that the local system 102 is not intended to limit the deployment mode of the system, and the local system 102 can be deployed on a local server of the enterprise or on a cloud server. The remote system 104 is an external system (e.g., a customs system) for the enterprise. The remote system 104 can receive various messages from the local system 102, process them accordingly, and then return response messages for the received messages to the local system 102.

As shown in FIG. 1, the data interface adapter 106 can obtain data from the local system 102 and generate a message to be sent based on such data. For example, in the environment 100, the data interface adapter 106 can generate messages 112, 114, 116, and 118. The generated messages have different time-sensitivity and can be classified into messages with high time-sensitivity and messages with low time-sensitivity. A message with high time-sensitivity may be, for example, a project registration message (e.g., a filing message) and an acknowledgment request message (e.g., a customs declaration message) as described above, which have high time-sensitivity. If the local system 102 fails to receive a response message from the remote system 104 in time after sending a message with high time-sensitivity, the normal workflow of the enterprise may be seriously and adversely impacted. A message with low time-sensitivity may be, for example, a historical data message (e.g., a write-off message) as described above. Even if the local system 102 does not receive a response message for the message with low time-sensitivity from the remote system 104 in time, this may have little impact on the normal workflow of the enterprise. In the environment 100, messages with high time-sensitivity (i.e., the messages 112 and 116) are represented by narrow blocks, and messages with low time-sensitivity (i.e., the messages 114 and 118) are represented by wide blocks.

In the related art, the data interface adapter 106 can only communicate with the remote system 104 through a message channel exclusive to the enterprise. However, a message with low time-sensitivity, such as a historical data message, may have a large size, which poses a challenge to the processing capacity of the remote system 104, thus easily causing the only message channel to be blocked and hindering the sending of subsequent messages. Therefore, in the environment 100, two message channels 108 and 110 are provided between the data interface adapter 106 and the remote system 104. The message channel 108 can be mainly used to send messages with high time-sensitivity, while the message channel 110 can be used to send both messages with high time-sensitivity and messages with low time-sensitivity, or mainly used to send messages with low time-sensitivity. For example, as shown in FIG. 1, the messages 112 and 116 are messages with high time-sensitivity, and the data interface adapter 106 can allocate to them a message channel 108 exclusively for messages with high time-sensitivity. The messages 114 and 118 are messages with low time-sensitivity, and the data interface adapter 106 can allocate the message channel 110 to them.

As such, as messages with high time-sensitivity usually have a small size, they are unlikely to block the message channel, and the message channel 108 is only used to send messages with high time-sensitivity, so the message channel 108 can be kept unobstructed, so that the local system 102 can receive response messages for the messages with high time-sensitivity from the remote system 104 in time. Meanwhile, all messages with low time-sensitivity that may lead to blockage of the message channel are sent via the message channel 110, so that even if the message channel 110 is blocked, there is no serious impact on the subsequent workflow of the enterprise.

It should be noted that although the local system 102 and the data interface adapter 106 are shown as separate parts in FIG. 1, in some embodiments, the data interface adapter 106 may be integrated in the local system 102 as a part of the local system 102. In some other embodiments, the data interface adapter 106 may also be deployed separately from the local system 102 as an independent system.

Figure 2:
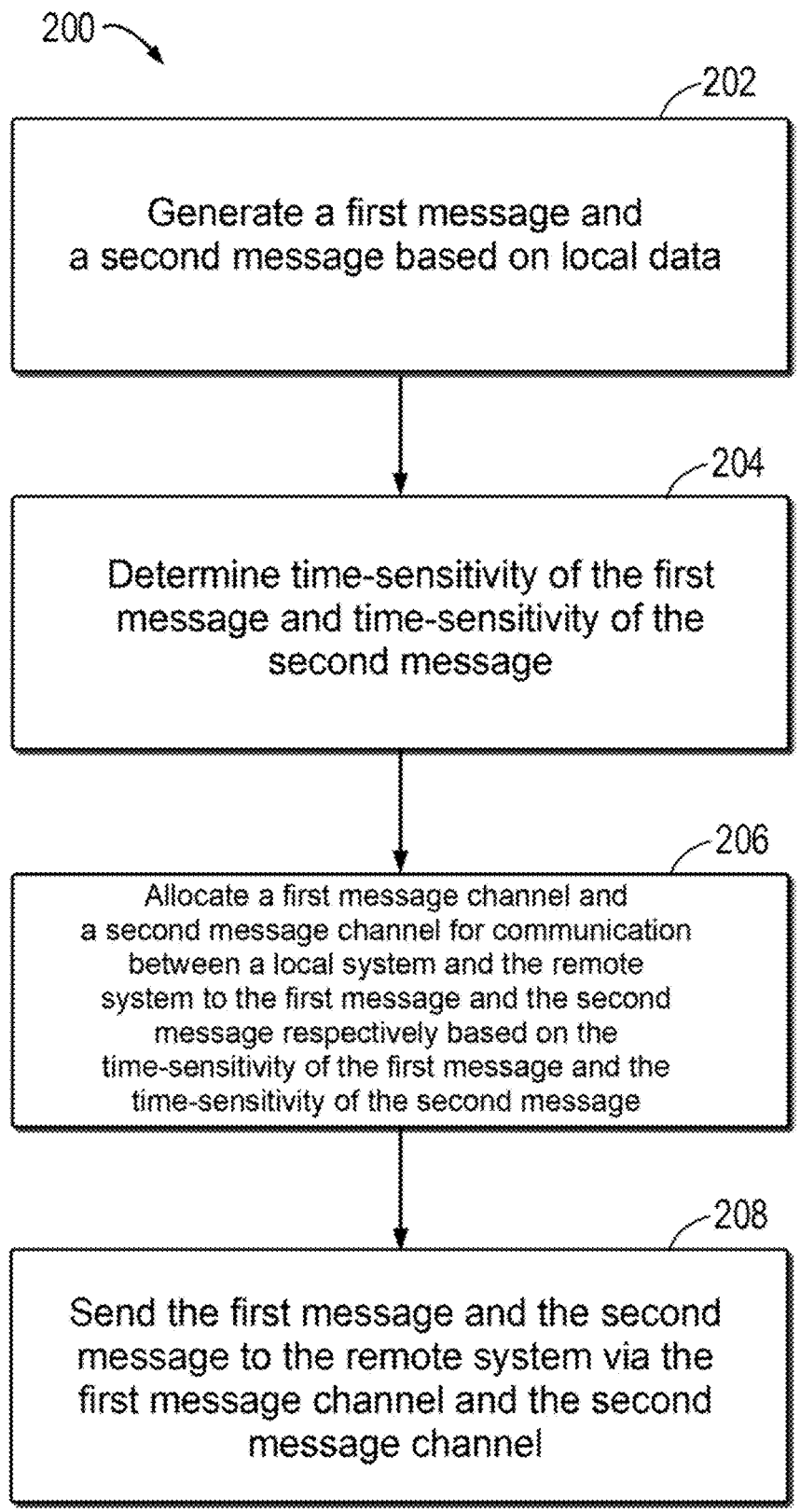
FIG. 2 is a flow chart of a method for sending a message according to some embodiments of the present disclosure.

FIG. 2 is a flow chart of a method 200 for sending a message according to some embodiments of the present disclosure. The method 200 may be performed by the data interface adapter 106 in FIG. 1, for example. As shown in FIG. 2, at block 202, the method 200 can generate a first message and a second message based on local data. For example, in the environment 100 shown in FIG. 1, the data interface adapter 106 can obtain the local data from the local system 102. The local data refers to data owned by an enterprise, which can be stored in a local storage device or in a cloud storage space. The data interface adapter 106 can generate the message 112 and the message 114 based on the local data.

At block 204, the method 200 can determine time-sensitivity of the first message and time-sensitivity of the second message. For example, in the environment 100 shown in FIG. 1, the data interface adapter 106 can determine that the message 112 is a message with high time-sensitivity and the message 114 is a message with low time-sensitivity. For example, the data interface adapter 106 can determine the type of the message 112 (e.g., as a project registration message or an acknowledgment request message) and the type of the message 114 (e.g., as a historical data message), and thus determine that the message 112 is a message with high time-sensitivity and the message 114 is a message with low time-sensitivity.

At block 206, the method 200 can allocate a first message channel and a second message channel for communicating with the remote system to the first message and the second message respectively based on the time-sensitivity of the first message and the time-sensitivity of the second message. For example, in the environment 100 shown in FIG. 1, the data interface adapter 106 can determine that the message 112 is a message with high time-sensitivity, so the message channel 108 is allocated to the message 112. In addition, the data interface adapter 106 can determine that the message 114 is a message with low time-sensitivity, so the message channel 110 is allocated to the message 114.

At block 208, the method 200 can send the first message and the second message to the remote system via the first message channel and the second message channel. For example, in the environment 100 shown in FIG. 1, the data interface adapter 106 can send the message 112 to the remote system 104 via the message channel 108 and send the message 114 to the remote system 104 via the message channel 110.

In this way, simultaneous data transmission can be realized by using the message channels 108 and 110, thus enhancing the data transmission efficiency and the ability to handle high data load of the system. In addition, this dual-channel architecture can enhance the robustness of the system, and even if the message channel 110 is blocked, it can be ensured that messages with high time-sensitivity can be sent to the remote system 104 via the message channel 108, thus reducing the impact on the subsequent workflow and improving the working efficiency of the enterprise.

Figure 3:
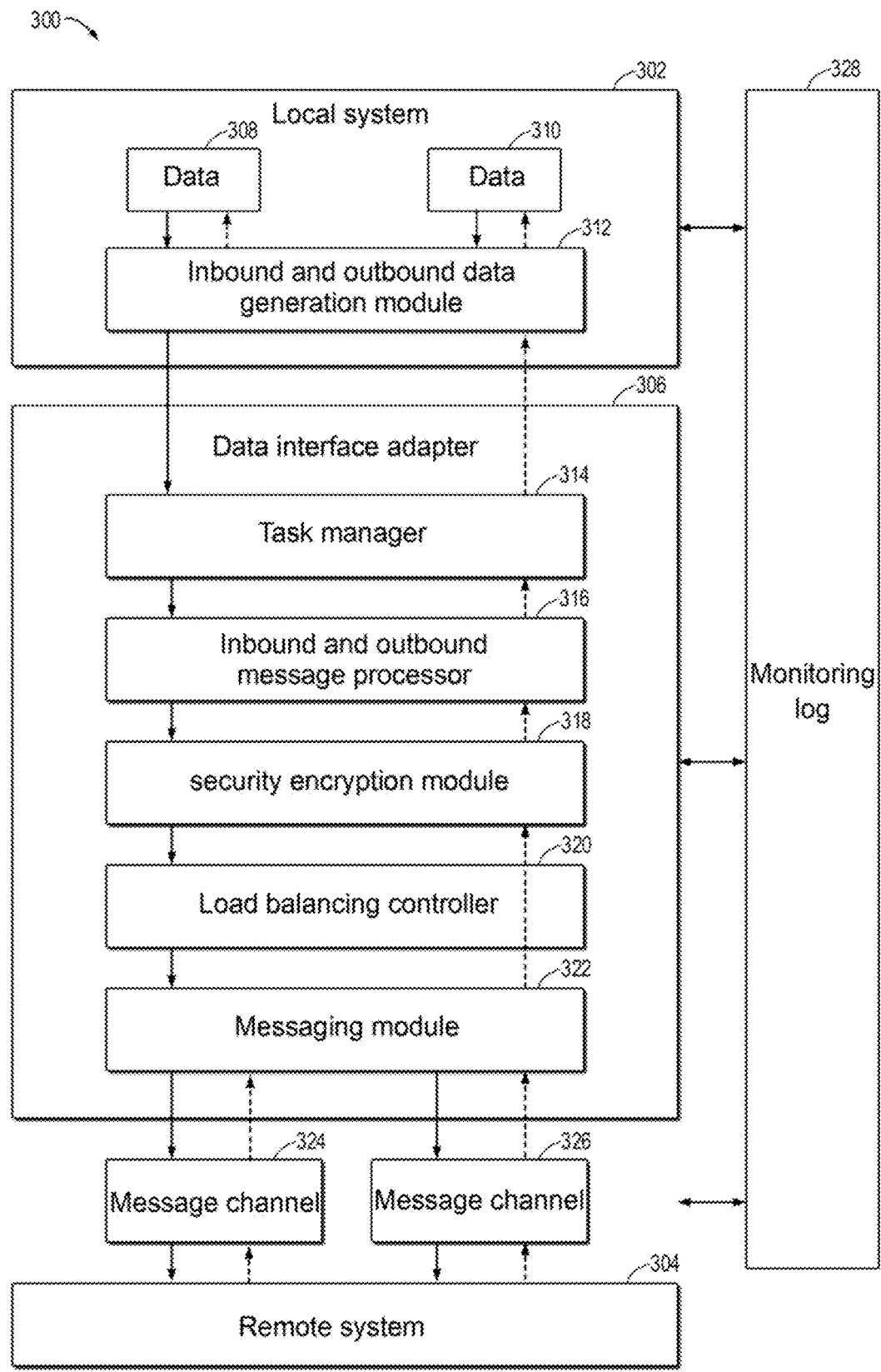
FIG. 3 is a schematic diagram of an example process of data flow according to some embodiments of the present disclosure.

FIG. 3 is a schematic diagram of an example process 300 of data flow according to some embodiments of the present disclosure. In FIG. 3, the data flow from a local system 302 (i.e., the outbound data flow) to a remote system 304 (e.g., a customs system), is represented by the solid arrow, and the data flow from the remote system 304 to the local system 302 (i.e., the inbound data flow) is represented by the dashed arrow. As shown in FIG. 3, data 308 and 310 are stored in the local system 302, where the data 308 may be data corresponding to a message with high time-sensitivity (e.g., filing data or customs clearance data), and the data 310 may be data corresponding to a message with low time-sensitivity (e.g., write-off data). The data 308 and 310 can be stored in a format required by the local system 302. Then, an inbound and outbound data generation module 312 can extract the data 308 and 310 from the local system 302 and convert them into a format that meets the requirements of the remote system 304.

As shown in FIG. 3, a task manager 314 in the data interface adapter 306 can receive data from the inbound and outbound data generation module 312, and then create corresponding outbound tasks based on such data. For example, the inbound and outbound data generation module 312 can create an outbound task for the data 308 and another outbound task for the data 310. Then, an inbound and outbound message processor 316 can receive tasks from the task manager 314 and generate corresponding outbound messages based on these tasks. For example, the inbound and outbound message processor 316 can generate a message with high time-sensitivity based on the task corresponding to the data 308 and a message with low time-sensitivity based on the task corresponding to the data 310. In order to improve the security, a security encryption module 318 can add a signature to a generated outbound message and encrypt the outbound message. In some embodiments, the security encryption module 318 can read the authentication information from the authentication certificate provided by the remote system 304 to a specific enterprise, and the authentication information is used to verify the identity of the account to use the message channel.

As shown in FIG. 3, after the outbound message is encrypted by the security encryption module 318, a load balancing controller 320 can allocate an appropriate message channel for the outbound message. In some embodiments, the load balancing controller 320 can obtain the current load of each message channel (e.g., the number and size of messages to be sent through the message channel, etc.) and allocate a message channel to an outbound message in a balanced manner based on the current load of each message channel. In some embodiments, the load balancing controller 320 can classify an outbound message according to the message type and determine the time-sensitivity of the outbound message based on the message type, and then can allocate a corresponding message channel based on the time-sensitivity of the outbound message. For example, the load balancing controller 320 can determine that the message type of an outbound message is a project registration message or an acknowledgment request message, thus determining that the message is a message with high time-sensitivity. The load balancing controller 320 can also determine that the message type of an outbound message is a historical data message, and thus determine that the message is a message with low time-sensitivity.

In some embodiments, if the outbound message has a high time-sensitivity (e.g., the message corresponding to the data 308, also called the first message), the load balancing controller 320 can allocate a message channel 324 (also called the first message channel) to the message. The message channel 324 may be a message channel dedicated to messages with high time-sensitivity. If the outbound message has a low time-sensitivity (e.g., the message corresponding to the data 310, also called the second message), the load balancing controller 320 can allocate a message channel 326 (also called the second message channel) to the message. The message channel 326 can be used to send both messages with high time-sensitivity and messages with low time-sensitivity. In some embodiments, the load balancing controller 320 can prioritize multiple received outbound messages, and these outbound messages will be sent to a message queue according to their priorities. In this way, it can be ensured that the most urgent and important message can be processed preferentially. This means that the data related to the business with high time-sensitivity requirements can be sent quickly, thus reducing the waiting time and improving the efficiency of the workflow.

In the process 300, a messaging module 322 can send an outbound message to the corresponding message channel based on the message channel allocated to the outbound message. For example, the messaging module 322 can send a message with high time-sensitivity corresponding to the data 308 to a message queue corresponding to the message channel 324 and send a message with low time-sensitivity corresponding to the data 310 to a message queue corresponding to the message channel 326. The message channels 324 and 326 can then send the outbound messages in their respective message queues to the remote system 304.

After receiving the outbound message from an enterprise, the remote system 304 can return a response message corresponding to the outbound message to the enterprise. The response message is received via the messaging module 322. In some embodiments, if an outbound message is sent to the remote system 304 via the message channel 324, a response message (i.e., an inbound message) for the outbound message can be received from the remote system 304 via the message channel 324. If the outbound message is sent to the remote system 304 via the message channel 326, a response message for the outbound message can be received from the remote system 304 via the message channel 326. Then, the security encryption module 318 can decrypt the received response message. The decrypted response message can be parsed by the inbound and outbound message processor 316, and the corresponding task status can be updated by the task manager 314. The inbound and outbound data generation module 312 can convert the parsed response message into data in a format required by the local system 302, which can be stored in the local system 302 or used to update the data 308 and 310.

In some embodiments, the data generated in various steps of the process 300 can be logged in a monitoring log 328. By analyzing the monitoring log 328, it can be determined whether there is a message that has failed to be sent in the message channels 324 and 326, the number of messages waiting to be sent due to failed messages in front of the queue, and the like. These analysis results can issue an early warning to a system administrator in the form of e-mail or the like, so that the abnormality of the message channels can be dealt with in time, thereby ensuring the smooth implementation of workflow of the enterprise.

Figure 4:
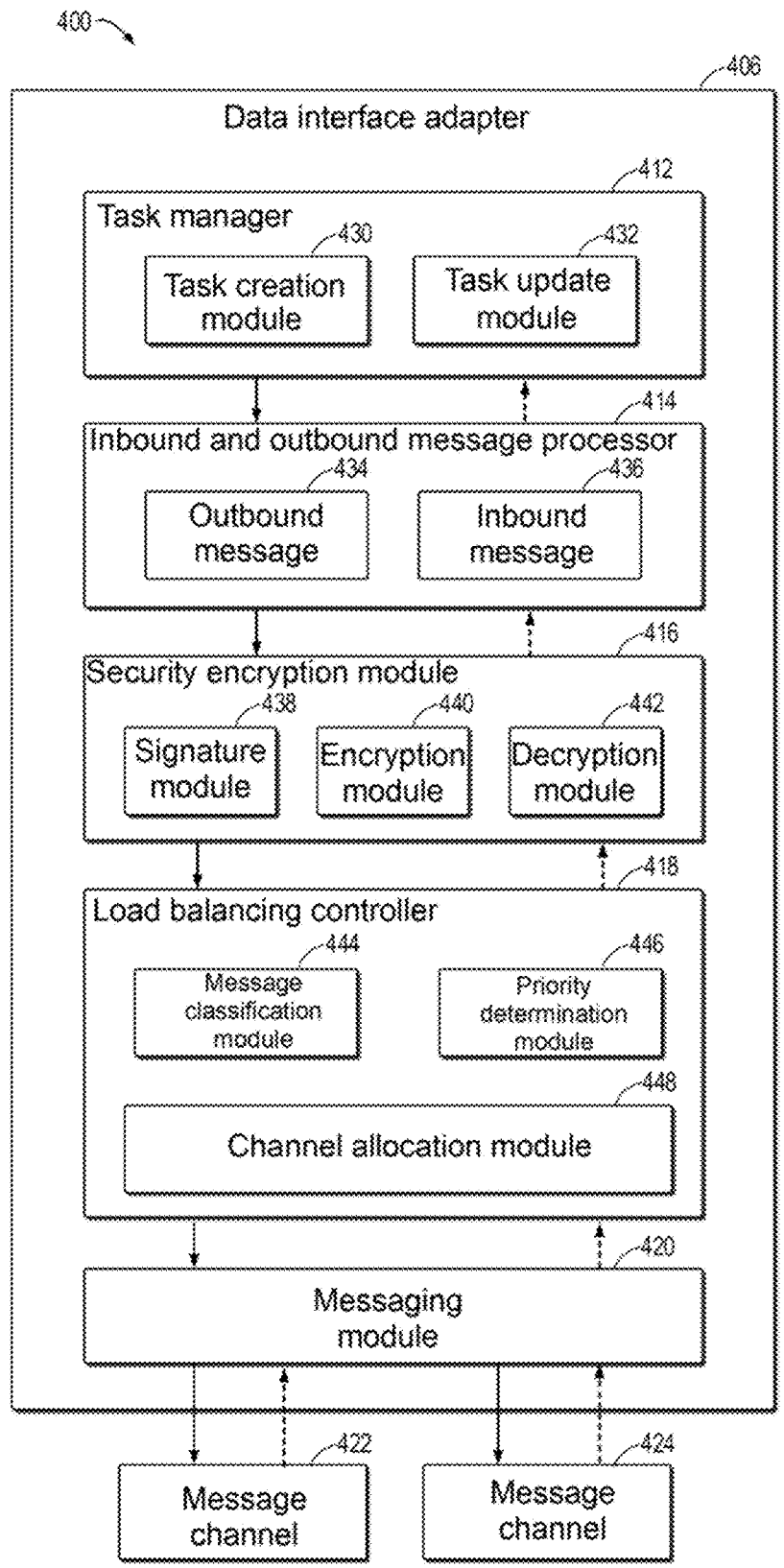
FIG. 4 is a schematic diagram of an example of a structure including a data interface adapter according to some embodiments of the present disclosure.

FIG. 4 is a schematic diagram of an example 400 of a structure including a data interface adapter according to some embodiments of the present disclosure. As shown in FIG. 4, a data interface adapter 406 includes a task manager 412, which includes a task creation module 430 and a task update module 432. When the task manager 412 receives outbound data from an inbound and outbound data generation module (e.g., the inbound and outbound data generation module 312 shown in FIG. 3), the task creation module 430 can create a corresponding task based on the received data. An inbound and outbound message processor 414 can then generate an outbound message 434 based on the created task. A security encryption module 416 includes a signature module 438, an encryption module 440, and a decryption module 442. The signature module 438 can add a signature for authentication to the outbound message 434. Then, the encryption module 440 can encrypt the outbound message 434 to improve the security during message transmission.

A load balancing controller 418 includes a message classification module 444, a priority determination module 446, and a channel allocation module 448. The message classification module 444 can determine the message type of the outbound message 434, and then classify the outbound message 434 into a message with high time-sensitivity or a message with low time-sensitivity based on the message type. For example, if the message type of the outbound message 434 is a project registration message or an acknowledgment request message, the message classification module 444 can classify it as a message with high time-sensitivity. If the message type of the outbound message 434 is a historical data message, the message classification module 444 can classify it as a message with low time-sensitivity. The priority determination module 446 can prioritize multiple outbound messages that arrive at the same time. In some embodiments, the priority determination module 446 can prioritize multiple outbound messages based on the categories of the messages, the levels of objects associated with the messages, and the categories of resources associated with the messages. Then, the channel allocation module 448 can allocate a message channel 422 or 424 to the outbound message 434 based on the category and priority of the message. The outbound message 434 is then sent to the remote system over the message channel 422 or 424 via a messaging module 420 of the data interface adapter 406.

After the outbound message 434 is sent to the remote system via the messaging module 420 and the message channel 422 or 424, the messaging module 420 can receive a response message, that is, an encrypted inbound message 436, from the remote system via the message channel 422 or 424. Then, the decryption module 442 of the security encryption module 416 can decrypt the encrypted inbound message 436 to obtain the inbound message 436. Then, the inbound and outbound message processor 414 can parse the inbound message 436, and the task update module 432 can update the status of the corresponding task based on the data parsed from the inbound message 436.

Figure 5:
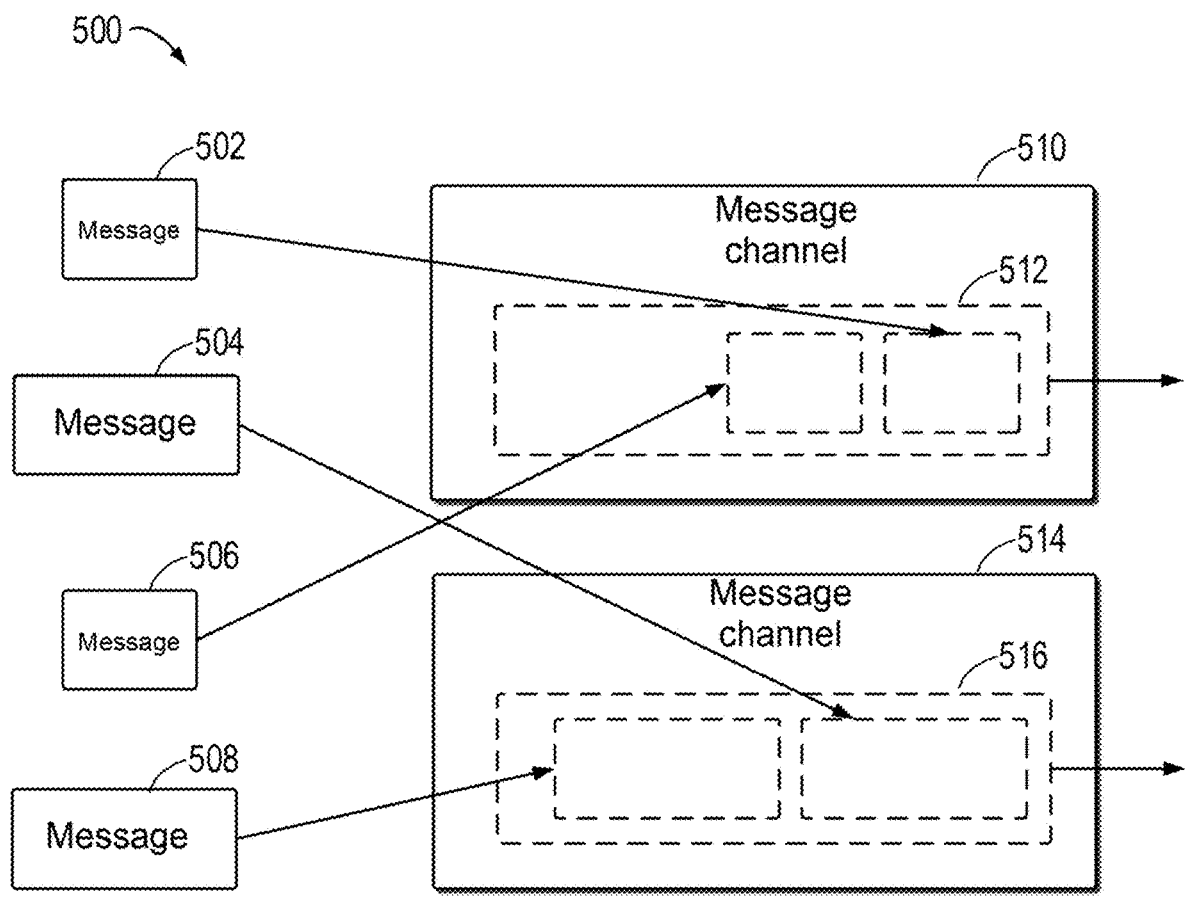
FIG. 5 is a schematic diagram of an example of allocating message channels based on the time-sensitivity of messages according to some embodiments of the present disclosure.

FIG. 5 is a schematic diagram of an example 500 of allocating message channels based on the time-sensitivity of messages according to some embodiments of the present disclosure. As shown in FIG. 5, the example 500 includes messages 502 and 506 with high time-sensitivity and messages 504 and 508 with low time-sensitivity. Message channels 510 and 514 dedicated to a specific enterprise are provided between a local system and a remote system. The message channel 510 includes a message queue 512, and the message channel 514 includes a message queue 516. Messages sent by the data interface adapter to the remote system can be added to the message queues 512 and 516 and sent to the remote system in a first-in-first-out manner. For example, if the messages 502 and 506 are both allocated to the message channel 510, the messages 502 and 506 can enter the message queue 512 according to the allocated priorities. If the priority of the message 502 is higher than that of the message 506, the message 502 can enter the message queue 512 in preference to the message 506, and the message 502 can be sent out from the message queue 512 in preference to the message 506. The message queues 512 and 516 can be implemented using technologies such as RabbitMQ, for example.

In the example 500, the message channel 510 may be a message channel reserved for messages with high time-sensitivity (i.e., dedicated to messages with high time-sensitivity), and the message channel 514 may be a message channel that allows sending both messages with low time-sensitivity and messages with high time-sensitivity. The load balancing controller of the data interface adapter (e.g., the load balancing controller 320 in FIG. 3) can determine the categories of the messages 502, 504, 506, and 508, respectively. For example, the message 502 may be a project registration message, the message 506 may be an acknowledgment request message, and the messages 504 and 508 may be historical data messages. As the project registration message and the acknowledgment request message require that the response message returned by the remote system can be received in time, and the historical data message has a low time-sensitivity requirement for receipt of the response message, the load balancing controller can determine the messages 502 and 506 as messages with high time-sensitivity and the messages 504 and 508 as messages with low time-sensitivity. Then, the load balancing controller can allocate the message channel 510 dedicated to messages with high time-sensitivity to the messages 502 and 506, and the message channel 514 to the messages 504 and 508.

Since messages with low time-sensitivity may have a large size, such messages are likely to cause blockage of the message channel, while messages with high time-sensitivity usually have a small size, and are unlikely to cause blockage of the message channel. Accordingly, with the approach of the example 500, the message channel 510 is only used to send messages with high time-sensitivity, so it is unlikely to be blocked, and the successful sending of messages with high time-sensitivity can be ensured, so that response messages from the remote system can be received in time, thus ensuring the smooth execution of the workflow of the enterprise.

In some embodiments, another message can be generated based on local data, and the time-sensitivity of this message can be determined based on the message type of this message. Then, the time-sensitivity of multiple messages to be sent can be determined, and if the other message has a high time-sensitivity and the time-sensitivity of the multiple messages to be sent meets a predetermined condition, the message channel can be allocated to the other message. In some embodiments, the predetermined condition may include that all messages of the multiple messages to be sent have high time-sensitivity.

Figure 6:
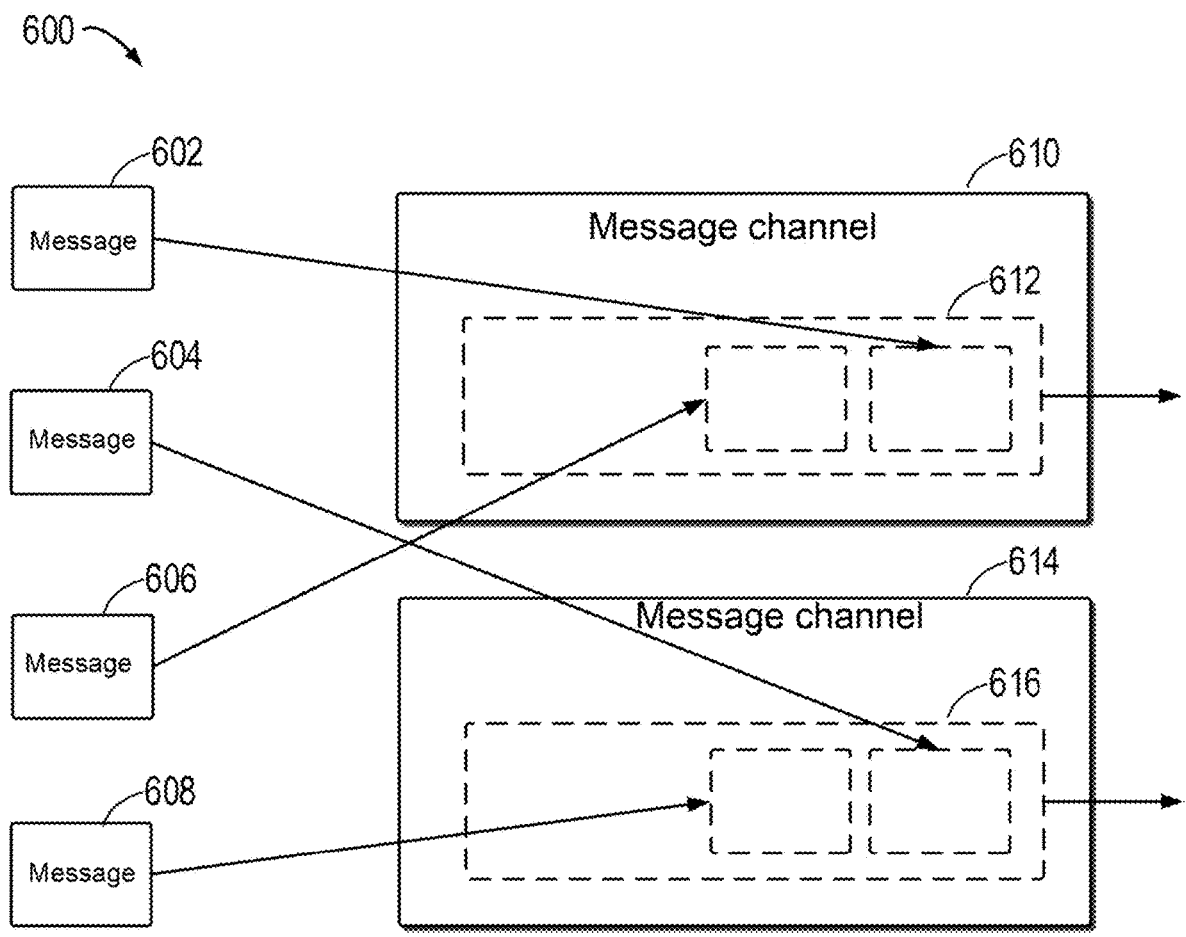
FIG. 6 is a schematic diagram of an example of evenly allocating message channels according to some embodiments of the present disclosure.

FIG. 6 is a schematic diagram of an example 600 of evenly allocating message channels according to some embodiments of the present disclosure. As shown in FIG. 6, the example 600 includes messages with high time-sensitivity 602, 604, 606, and 608. In addition, the example 600 also includes a message channel 610 dedicated to messages with high time-sensitivity and a message channel 614 that allows sending both messages with high time-sensitivity and messages with low time-sensitivity. The load balancing controller can determine that the message 602 is a message with high time-sensitivity, so the message channel 610 is allocated to the message 602. Then, when the load balancing controller needs to allocate a message channel for the message 604, as the message 604 is a message with high time-sensitivity, the load balancing controller can determine the time-sensitivity of the messages 606 and 608 to be sent. In the example 600, both messages 606 and 608 are messages with high time-sensitivity, so the message channel 614 can be allocated to the message 604. In addition, when allocating a message channel for subsequent messages 606 and 608, the load balancing controller can evenly allocate the message channels 610 and 614 to the messages 606 and 608. For example, the load balancing controller can allocate the message channel 610 to the message 606 and then allocate the message channel 614 to the message 608.

In the example 600, the above process may include, for example, placing the message 602 in a message queue 612 of the message channel 610, placing the message 604 in a message queue 616 of the message channel 614, placing the message 606 in the message queue 612, and placing the message 608 in the message queue 616 in sequence. In this way, when all the messages to be sent are messages with high time-sensitivity, two message channels can be evenly distributed to the multiple messages to be sent, so that the resources of the two message channels can be fully utilized, and the loads of the two message channels are more balanced, thereby improving the efficiency of message sending and reducing the waiting time.

In some embodiments, in order to further improve the efficiency of message sending when there is a message with low time-sensitivity among the messages to be sent, another message can be generated based on local data, and the time-sensitivity of this message can be determined based on the message type of this message. Then, if this message has a high time-sensitivity, the message channel that allows sending messages with low time-sensitivity can be allocated to this message, and this message can be sent to the remote system in preference to the messages with low time-sensitivity.

Figure 7:
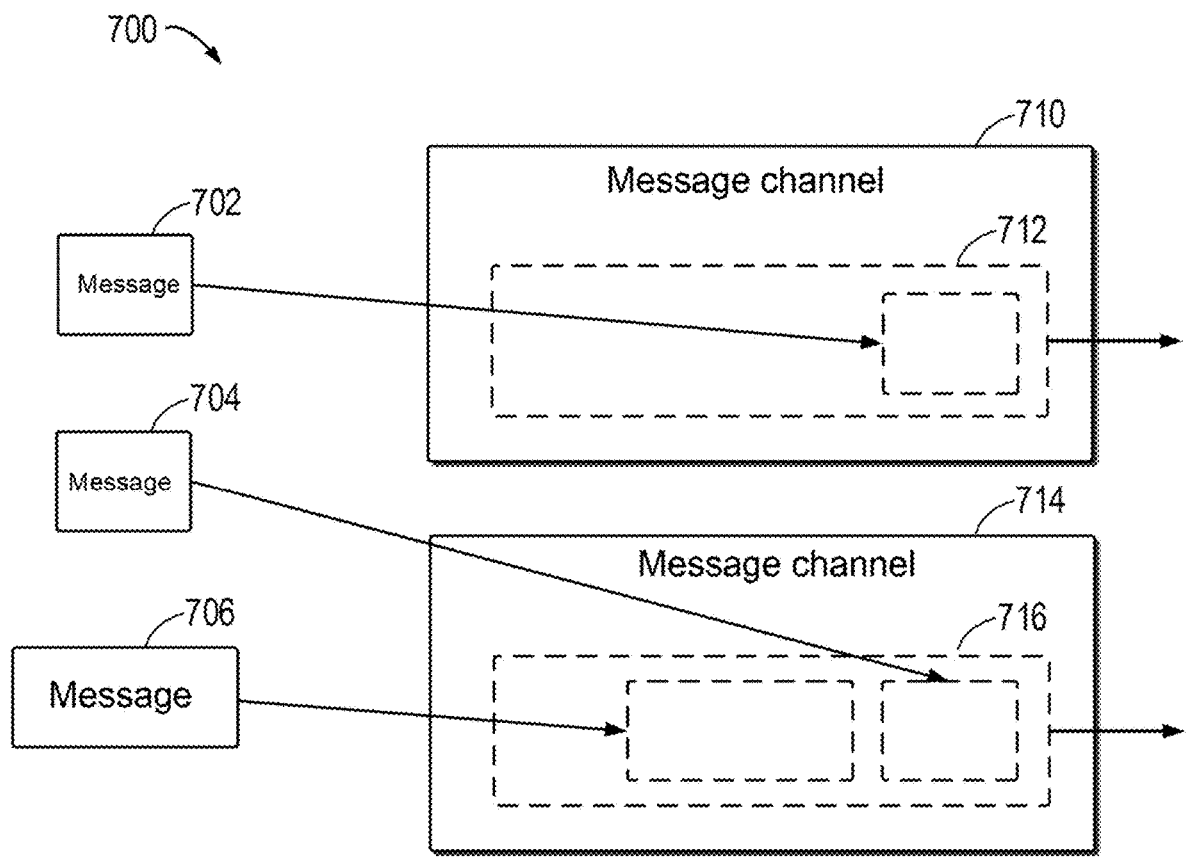
FIG. 7 is a schematic diagram of an example in which a message with high time-sensitivity is allocated to a message channel that allows sending messages with low time-sensitivity and is sent in preference to a message with low time-sensitivity according to some embodiments of the present disclosure.

FIG. 7 is a schematic diagram of an example 700 in which a message with high time-sensitivity is allocated to a message channel that allows sending messages with low time-sensitivity and is sent in preference to a message with low time-sensitivity according to some embodiments of the present disclosure. As shown in FIG. 7, the example 700 includes messages with high time-sensitivity 702 and 704 and a message with low time-sensitivity 706. In addition, the example 700 also includes a message channel 710 dedicated to messages with high time-sensitivity and a message channel 714 that allows sending both messages with high time-sensitivity and messages with low time-sensitivity. In the example 700, the load balancing controller can preferentially allocate a message channel for a message with high time-sensitivity. For example, the load balancing controller can determine that the message 702 is a message with high time-sensitivity, so it allocates the message channel 710 to the message 702. Then, the load balancing controller can allocate a message channel to the message 704. Since the message 704 is a message with high time-sensitivity, the load balancing controller can preferentially allocate a message channel for the message 704 after determining that the message 706 is a message with low time-sensitivity. In the example 700, the load balancing controller can allocate the message channel 714 for sending messages with low time-sensitivity to the message 704. Then, the load balancing controller can allocate the message channel 714 to the message 706 and enable the message 706 to enter a message queue 716 of the message channel 714 after the message 704.

In the example 700, the above process may include, for example, placing the message 702 in a message queue 712 of the message channel 710, placing the message 704 in the message queue 716 of the message channel 714, and placing the message 706 in the message queue 716 in sequence. In this way, in the case where there is a message with low time-sensitivity among the messages to be sent, all the messages with high time-sensitivity can be preferentially placed in the two message channels evenly, and then the message with low time-sensitivity can be placed in the message channel that allows sending messages with low time-sensitivity. In this way, the two message channels can be used to preferentially send the messages with high time-sensitivity to the remote system, thus improving the efficiency of message sending and reducing the waiting time.

In some embodiments, another message can be generated based on local data, and the time-sensitivity of this message can be determined based on the message type of this message. If this message has a high time-sensitivity, a message channel dedicated to messages with high time-sensitivity can be allocated to this message, and the sending priorities of this message and other messages with high time-sensitivity can be determined based on the object levels associated with the messages. In some embodiments, the object levels associated with the messages can be determined, and a message with a high object level can be sent to the remote system in preference to the other message. If the two messages have the same object level, the sending priorities of the two messages can be determined based on the resource categories associated with the messages.

Figure 8:
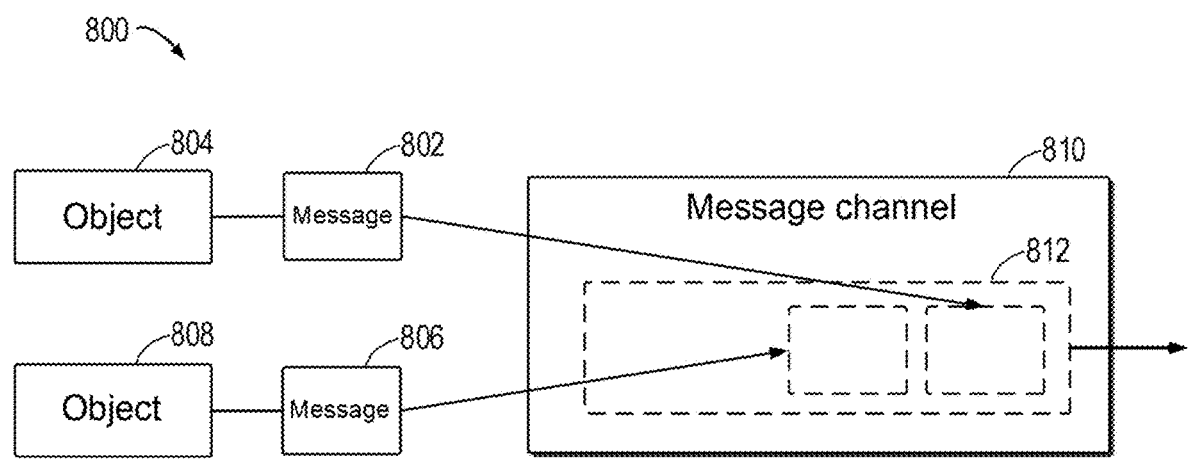
FIG. 8 is a schematic diagram of an example of determining sending priorities based on levels of objects associated with messages in the case of multiple messages having the same time-sensitivity according to some embodiments of the present disclosure.

FIG. 8 is a schematic diagram of an example 800 of determining sending priorities based on levels of objects associated with messages in the case of multiple messages having the same time-sensitivity according to some embodiments of the present disclosure. As shown in FIG. 8, the example 800 includes messages 802 and 806 with the same time-sensitivity. In addition, the example 800 also includes a message channel 810. When the load balancing controller determines that the message 802 and the message 806 have the same time-sensitivity, the order of placing these messages into a message queue 812 of the message channel 810 can be determined by determining the levels of the objects associated with the messages. For example, in the example 800, the message 802 is associated with an object 804 (e.g., a user), the message 806 is associated with an object 808 (e.g., another user), and the level of the object 804 (e.g., a predefined level) is higher than that of the object 808. Therefore, the load balancing controller can place the message 802 in the message queue 812 in preference to the message 806, so that the message 802 can be sent to the remote system in preference to the message 806. In this way, messages that are more valuable to the enterprise can be processed preferentially, thus improving the satisfaction of the clients.

Figure 9:
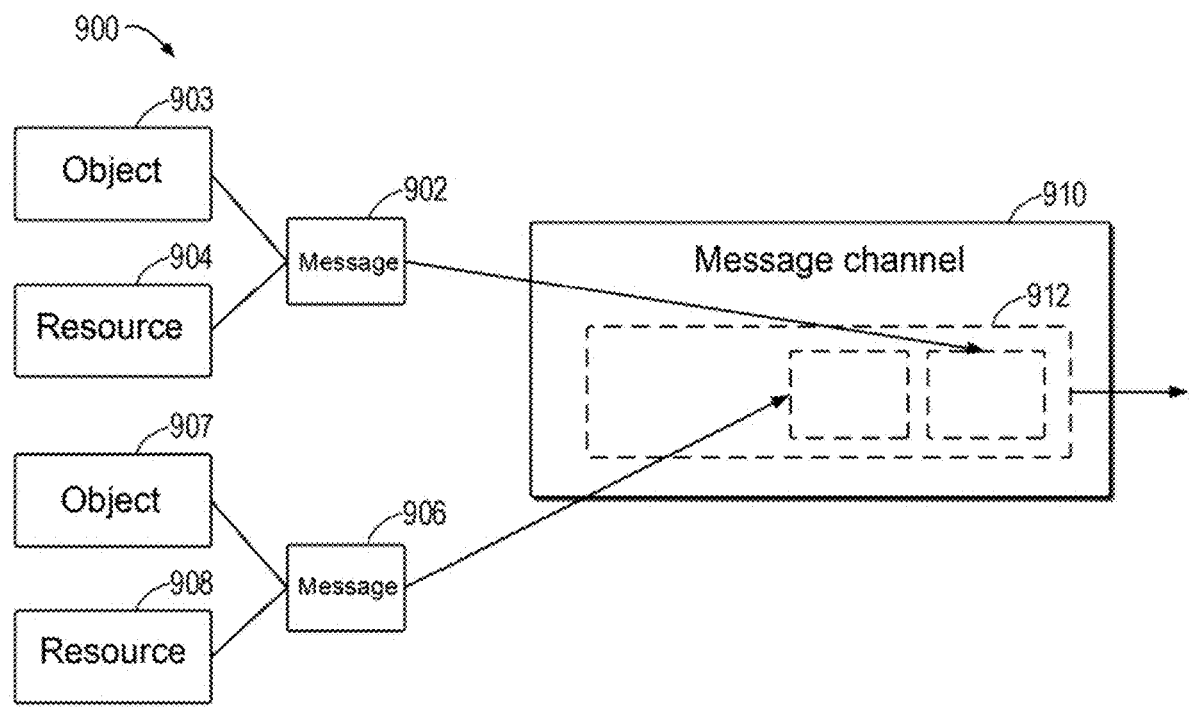
FIG. 9 is a schematic diagram of an example of determining sending priorities based on categories of resources associated with messages in the case of multiple messages having the same time-sensitivity and the same object level according to some embodiments of the present disclosure.

In some embodiments, if two messages have the same object level, the resource categories associated with the messages can be determined, and the message with a higher priority can be preferentially sent to the remote system. FIG. 9 is a schematic diagram of an example 900 of determining sending priorities based on categories of resources associated with messages in the case of multiple messages having the same time-sensitivity and the same object level according to some embodiments of the present disclosure. As shown in FIG. 9, the example 900 includes messages 902 and 906 with the same time-sensitivity. In addition, the example 900 also includes a message channel 910. When the load balancing controller determines that the message 902 and the message 906 have the same time-sensitivity, it can determine the level of the object 903 associated with the message 902 and the level of the object 907 associated with the message 906. However, if the object 903 and the object 907 are of the same level, the order of placing these messages in the message queue 912 of the message channel 910 can be determined by determining the priorities of the resources associated with the messages. For example, in the example 900, the message 902 is associated with a resource 904 (e.g., a storage server), the message 906 is associated with a resource 908 (e.g., a keyboard or mouse), and the priority of the resource 904 is higher than that of the resource 908. Therefore, the load balancing controller can place the message 902 in the message queue 912 in preference to the message 906, so that the message 902 can be sent to the remote system in preference to the message 906. In this way, messages that are more valuable to the enterprise or more important to the clients can be processed preferentially, thus improving the satisfaction of the clients.

Figure 10:
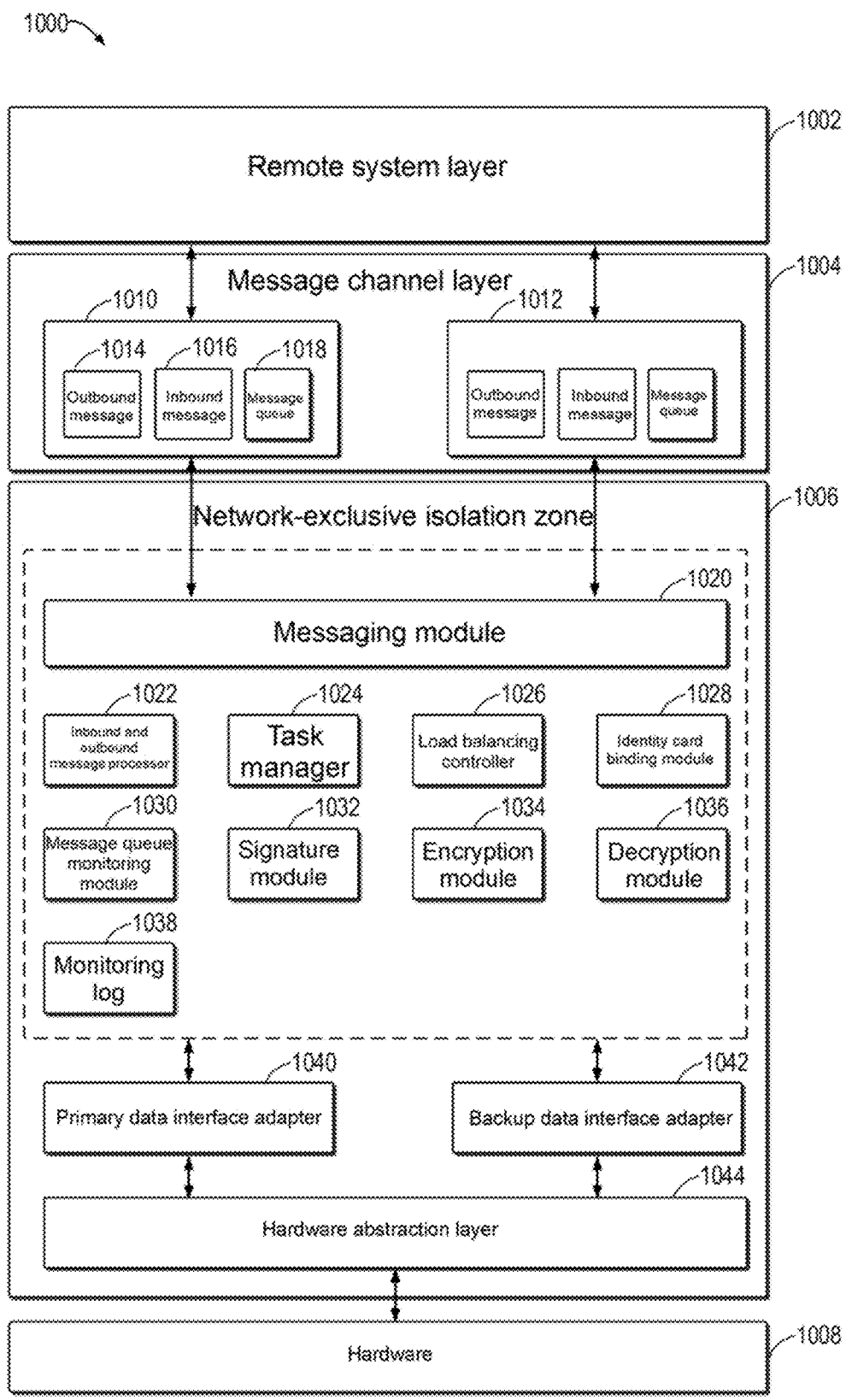
FIG. 10 is a schematic diagram of an example network architecture for sending a message according to some embodiments of the present disclosure.

FIG. 10 is a schematic diagram of an example network architecture 1000 for sending a message according to some embodiments of the present disclosure. As shown in FIG. 10, the network architecture 1000 includes a remote system layer 1002, which includes a remote system outside the enterprise that communicates with the local system. The network architecture 1000 also includes a message channel layer 1004, which includes a message channel 1010 and a message channel 1012. Taking the message channel 1010 as an example, it includes a message queue 1018 configured to send an outbound message 1014 and receive an inbound message 1016. The network architecture 1000 also includes a network-exclusive isolation zone 1006, which is isolated from the intranet and extranet of the enterprise by using a firewall, so that the security of data communication can be improved.

The network-exclusive isolation zone 1006 includes a primary data interface adapter 1040 and a backup data interface adapter 1042. When the primary data interface adapter 1040 fails, the backup data interface adapter 1042 can be enabled, which can enhance the stability and robustness of the system. The primary data interface adapter 1040 and the backup data interface adapter 1042 have similar functions. Taking the primary data interface adapter 1040 as an example, it illustratively comprises instances of the components shown in the dashed box in the figure. These components include a messaging module 1020 configured to send messages to the remote system and receive messages from the remote system, an inbound and outbound message processor 1022 configured to generate and parse messages, a task manager 1024 configured to create or update tasks corresponding to messages, a load balancing controller 1026 configured to allocate message channels for messages, an identity card binding module 1028 configured to authenticate the enterprise, a message queue monitoring module 1030 configured to monitor whether the message queue is blocked or failed to send, a signature module 1032 configured to add a signature to outbound messages, an encryption module 1034 configured to encrypt outbound messages, a decryption module 1036 configured to decrypt inbound messages, and a monitoring log 1038 configured to log process data. The backup data interface adapter 1042 illustratively comprises corresponding instances of these components.

In addition, the network-exclusive isolation zone 1006 also includes a hardware abstraction layer 1044 configured to provide hardware independence and uniformly manage hardware resources. In addition, the network architecture 1000 also includes hardware 1008 configured to store enterprise internal data.

Figure 11:
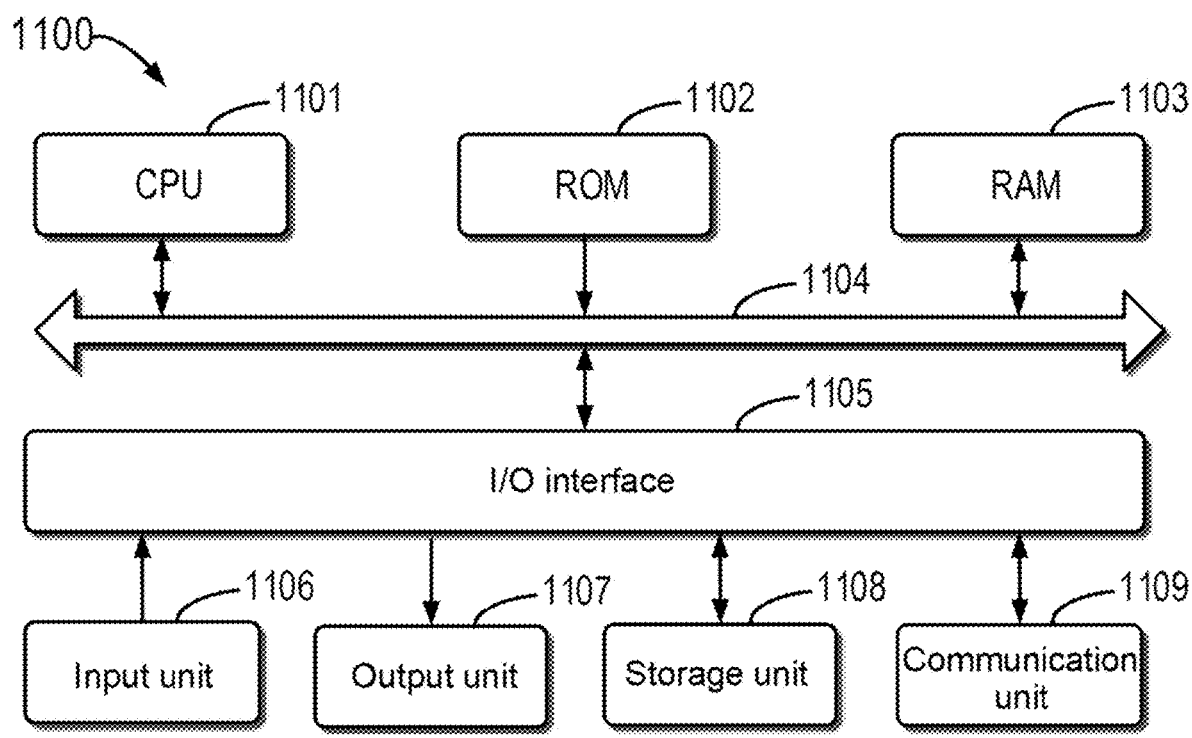
FIG. 11 is a block diagram of a device that can implement multiple embodiments of the present disclosure.

FIG. 11 is a block diagram of an example device 1100 that can be used to implement embodiments of the present disclosure. For example, the data interface adapter 106 shown in FIG. 1 may be the example device 1100 shown in FIG. 11. As shown in the figure, the device 1100 includes a computation unit 1101, illustratively comprising a Central Processing Unit (CPU), that can perform various appropriate actions and processing according to computer program instructions stored in a Read-Only Memory (ROM) 1102 or computer program instructions loaded from a storage unit 1108 into a Random Access Memory (RAM) 1103. Various programs and data required for the operation of the device 1100 may also be stored in the RAM 1103. The computation unit 1101, the ROM 1102, and the RAM 1103 are connected to each other via a bus 1104. An Input/Output (I/O) interface 1105 is also connected to the bus 1104.

Multiple components in the device 1100 are connected to the I/O interface 1105, including: an input unit 1106, such as a keyboard and a mouse; an output unit 1107, such as various types of displays and speakers; the storage unit 1108, such as a magnetic disk and an optical disc; and a communication unit 1109, such as a network card, a modem, and a wireless communication transceiver. The communication unit 1109 allows the device 1100 to exchange information/data with other devices through a computer network such as the Internet and/or various telecommunication networks.

The computation unit 1101 may be various general-purpose and/or special-purpose processing components with processing and computing powers. Some examples of the computation unit 1101 include, but are not limited to, one or more instances of the above-noted CPU, Graphics Processing Units (GPUs), various specialized Artificial Intelligence (AI) computing chips, various computation units for running machine learning model algorithms, Digital Signal Processors (DSPs), and any appropriate processors, controllers, microcontrollers, and the like. The computation unit 1101 executes various methods and processes described above, such as the method 200. For example, in some embodiments, the method 200 may be implemented as a computer software program that is tangibly included in a machine-readable medium, such as the storage unit 1108. In some embodiments, part or all of the computer program may be loaded and/or installed to the device 1100 via the ROM 1102 and/or the communication unit 1109. When the computer program is loaded to the RAM 1103 and executed by the computation unit 1101, one or more steps of the method 200 described above can be performed. Alternatively, in other embodiments, the computation unit 1101 may be configured to perform the method 200 in any other suitable manner (such as by means of firmware).

The functions described herein may be executed at least in part by one or more hardware logic components. For example, without limitation, example types of hardware logic components that can be used include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program codes for implementing the method of the present disclosure may be written by using one programming language or any combination of multiple programming languages. The program codes may be provided to a processor or controller of a general-purpose computer, a special-purpose computer, or another programmable data processing device, such that the program codes, when executed by the processor or controller, implement the functions/operations specified in the flow charts and/or block diagrams. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a RAM, a ROM, an Erasable Programmable Read-Only Memory (EPROM or flash memory), an optical fiber, a portable Compact Disc Read-Only Memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in multiple implementations separately or in any suitable sub-combination.

Although the present subject matter has been described using a language specific to structural features and/or method logical actions, it should be understood that the subject matter defined in the following claims is not necessarily limited to the particular features or actions described above. Rather, the specific features and actions described above are merely example forms of implementing the claims.

What is claimed is:

1. A method for sending a message, comprising:
generating, in a local system of an enterprise, a first message and a second message based on local data of the enterprise, wherein the local system communicates, over a plurality of dedicated message channels established for exclusive use of the enterprise, with a remote system that also communicates over other dedicated message channels with respective other local systems of respective other enterprises;
determining time-sensitivity of the first message and time-sensitivity of the second message;
allocating a first message channel and a second message channel of the plurality of dedicated message channels for communicating with the remote system to the first message and the second message respectively based on the time-sensitivity of the first message and the time-sensitivity of the second message, wherein the first message channel and the second message channel have respective corresponding first and second message queues; and
sending the first message and the second message to the remote system via the first message channel and the second message channel respectively;
wherein the sending of messages via each of the first and second message channels is carried out in accordance with a hierarchy of prioritization indicators, including at least first indicators based on respective time-sensitivities of the messages, second indicators based on respective object levels associated with the messages and third indicators based on respective resource categories associated with the messages; and
wherein a given message is selected for placement in a particular one of the first and second message queues for sending over a corresponding one of the first and second message channels initially based on its first indicator, and if multiple messages to be placed in the particular message queue each have a same first indicator, then based on its second indicator, and if the multiple messages to be placed in the particular message queue each have the same first indicator and a same second indicator, then based on its third indicator.

2. The method of claim 1, wherein allocating a first message channel and a second message channel for communicating with a remote system to the first message and the second message respectively based on the time-sensitivity of the first message and the time-sensitivity of the second message comprises:
in response to the first message having first time-sensitivity, allocating the first message to the first message channel, wherein the first message channel is dedicated to messages with the first time-sensitivity; and
in response to the second message having second time-sensitivity, allocating the second message to the second message channel, wherein the first time-sensitivity is higher than the second time-sensitivity.

3. The method of claim 2, further comprising:
generating a third message based on the local data;
determining time-sensitivity of the third message based on a message type of the third message;
determining time-sensitivity of a plurality of messages to be sent; and
in response to the third message having the first time-sensitivity and the time-sensitivity of the plurality of messages meeting a predetermined condition, allocating the second message channel to the third message.

4. The method of claim 3, wherein the predetermined condition comprises all messages of the plurality of messages to be sent having the first time-sensitivity.

5. The method of claim 2, further comprising:
generating a fourth message based on the local data;
determining time-sensitivity of the fourth message based on a message type of the fourth message; and
in response to the fourth message having the first time-sensitivity and the second message having the second time-sensitivity, allocating the second message channel to the second message and the fourth message, and sending the fourth message to the remote system in preference to the second message.

6. The method of claim 2, further comprising:
generating a fifth message based on the local data;
determining time-sensitivity of the fifth message based on a message type of the fifth message; and
in response to both the first message and the fifth message having the first time-sensitivity, allocating the first message channel to the first message and the fifth message, and determining sending priorities of the first message and the fifth message based on object levels associated with the messages.

7. The method of claim 6, wherein determining sending priorities of the first message and the fifth message based on object levels associated with the messages comprises:
determining an object level associated with the first message and an object level associated with the fifth message;
in response to the object level associated with the first message being higher than the object level associated with the fifth message, sending the first message to the remote system in preference to the fifth message; and in response to the object level associated with the first message being equal to the object level associated with the fifth message, determining the sending priorities of the first message and the fifth message based on resource categories associated with the messages.

8. The method of claim 7, wherein determining the sending priorities of the first message and the fifth message based on resource categories associated with the messages comprises:

determining a resource category associated with the first message and a resource category associated with the fifth message; and in response to the priority of the resource category associated with the first message being higher than the priority of the resource category associated with the fifth message, sending the first message to the remote system in preference to the fifth message.

9. The method of claim 2, further comprising:

receiving a first response message corresponding to the first message from the remote system via the first message channel; and receiving a second response message corresponding to the second message from the remote system via the second message channel.

10. The method of claim 1, wherein determining time-sensitivity of the first message and time-sensitivity of the second message comprises:

determining a message type of the first message and a message type of the second message; and determining the time-sensitivity of the first message and the time-sensitivity of the second message based on the message type of the first message and the message type of the second message.

11. An electronic device, comprising:

at least one processor; and memory coupled to the at least one processor and having instructions stored therein, the instructions, when executed by the at least one processor, causing the electronic device to perform actions comprising:

generating, in a local system of an enterprise, a first message and a second message based on local data of the enterprise, wherein the local system communicates, over a plurality of dedicated message channels established for exclusive use of the enterprise, with a remote system that also communicates over other dedicated message channels with respective other local systems of respective other enterprises;

determining time-sensitivity of the first message and time-sensitivity of the second message;

allocating a first message channel and a second message channel of the plurality of dedicated message channels for communicating with the remote system to the first message and the second message respectively based on the time-sensitivity of the first message and the time-sensitivity of the second message, wherein the first message channel and the second message channel have respective corresponding first and second message queues; and sending the first message and the second message to the remote system via the first message channel and the second message channel respectively;

wherein the sending of messages via each of the first and second message channels is carried out in accordance with a hierarchy of prioritization indicators, including at least first indicators based on respective time-sensitivities of the messages, second indicators based on respective object levels associated with the messages and third indicators based on respective resource categories associated with the messages; and wherein a given message is selected for placement in a particular one of the first and second message queues for sending over a corresponding one of the first and second message channels initially based on its first indicator, and if multiple messages to be placed in the particular message queue each have a same first indicator, then based on its second indicator, and if the multiple messages to be placed in the particular message queue each have the same first indicator and a same second indicator, then based on its third indicator.

12. The electronic device of claim 11, wherein allocating a first message channel and a second message channel for communicating with a remote system to the first message and the second message respectively based on the time-sensitivity of the first message and the time-sensitivity of the second message comprises:

in response to the first message having first time-sensitivity, allocating the first message to the first message channel, wherein the first message channel is dedicated to messages with the first time-sensitivity; and in response to the second message having second time-sensitivity, allocating the second message to the second message channel, wherein the first time-sensitivity is higher than the second time-sensitivity.

13. The electronic device according to claim 12, wherein the actions further comprise:

generating a third message based on the local data;

determining time-sensitivity of the third message based on a message type of the third message;

determining time-sensitivity of a plurality of messages to be sent; and in response to the third message having the first time-sensitivity and the time-sensitivity of the plurality of messages meeting a predetermined condition, allocating the second message channel to the third message.

14. The electronic device of claim 13, wherein the predetermined condition comprises all messages of the plurality of messages to be sent having the first time-sensitivity.

15. The electronic device according to claim 12, wherein the actions further comprise:

generating a fourth message based on the local data;

determining time-sensitivity of the fourth message based on a message type of the fourth message; and in response to the fourth message having the first time-sensitivity and the second message having the second time-sensitivity, allocating the second message channel to the second message and the fourth message, and sending the fourth message to the remote system in preference to the second message.

16. The electronic device according to claim 12, wherein the actions further comprise:

generating a fifth message based on the local data;

determining time-sensitivity of the fifth message based on a message type of the fifth message; and in response to both the first message and the fifth message having the first time-sensitivity, allocating the first message channel to the first message and the fifth message, and determining sending priorities of the first message and the fifth message based on object levels associated with the messages.

17. The electronic device of claim 16, wherein determining sending priorities of the first message and the fifth message based on object levels associated with the messages comprises:
- determining an object level associated with the first message and an object level associated with the fifth message;
- in response to the object level associated with the first message being higher than the object level associated with the fifth message, sending the first message to the remote system in preference to the fifth message; and
- in response to the object level associated with the first message being equal to the object level associated with the fifth message, determining the sending priorities of the first message and the fifth message based on resource categories associated with the messages.

18. The electronic device of claim 17, wherein determining the sending priorities of the first message and the fifth message based on resource categories associated with the messages comprises:
- determining a resource category associated with the first message and a resource category associated with the fifth message; and
- in response to the priority of the resource category associated with the first message being higher than the priority of the resource category associated with the fifth message, sending the first message to the remote system in preference to the fifth message.

19. The electronic device of claim 11, wherein determining time-sensitivity of the first message and time-sensitivity of the second message comprises:
- determining a message type of the first message and a message type of the second message; and
- determining the time-sensitivity of the first message and the time-sensitivity of the second message based on the message type of the first message and the message type of the second message.

20. A computer program product, the computer program product being tangibly stored on a non-transitory computer-readable medium and comprising machine-executable instructions which, when executed by a machine, cause the machine to perform actions comprising:
- generating, in a local system of an enterprise, a first message and a second message based on local data of the enterprise, wherein the local system communicates, over a plurality of dedicated message channels established for exclusive use of the enterprise, with a remote system that also communicates over other dedicated message channels with respective other local systems of respective other enterprises;
- determining time-sensitivity of the first message and time-sensitivity of the second message;
- allocating a first message channel and a second message channel of the plurality of dedicated message channels for communicating with the remote system to the first message and the second message respectively based on the time-sensitivity of the first message and the time-sensitivity of the second message, wherein the first message channel and the second message channel have respective corresponding first and second message queues; and
- sending the first message and the second message to the remote system via the first message channel and the second message channel respectively;
- wherein the sending of messages via each of the first and second message channels is carried out in accordance with a hierarchy of prioritization indicators, including at least first indicators based on respective time-sensitivities of the messages, second indicators based on respective object levels associated with the messages and third indicators based on respective resource categories associated with the messages; and
- wherein a given message is selected for placement in a particular one of the first and second message queues for sending over a corresponding one of the first and second message channels initially based on its first indicator, and if multiple messages to be placed in the particular message queue each have a same first indicator, then based on its second indicator, and if the multiple messages to be placed in the particular message queue each have the same first indicator and a same second indicator, then based on its third indicator.

* * * * *